United States Patent [19]
King

[11] Patent Number: 5,976,385
[45] Date of Patent: Nov. 2, 1999

[54] POOL CLEANING AND SANITIZING APPARATUS

[76] Inventor: Joseph A. King, 16261 S. Temple Dr., Minnetonka, Minn. 55343

[21] Appl. No.: 09/037,196

[22] Filed: Mar. 9, 1998

[51] Int. Cl.⁶ .................. C02F 1/76; E04H 3/16
[52] U.S. Cl. .................. 210/754; 210/790; 210/169; 210/206; 210/242.1; 210/416.2; 15/1.7; 4/490; 422/265; 422/278
[58] Field of Search .................. 15/1.7; 4/490; 422/264, 265, 278; 210/169, 749, 198.1, 206, 242.1, 416.2, 753, 754, 790

[56] References Cited

U.S. PATENT DOCUMENTS

| | | |
|---|---|---|
| 1,681,308 | 8/1928 | Parker . |
| 2,235,278 | 3/1941 | Brunner . |
| 3,132,364 | 5/1964 | Oxley .................. 15/1.7 |
| 3,362,537 | 1/1968 | Cline . |
| 3,481,470 | 12/1969 | Valois .................. 210/169 |
| 3,746,168 | 7/1973 | Willinger et al. . |
| 3,755,843 | 9/1973 | Goertzen .................. 15/1.7 |
| 3,794,052 | 2/1974 | Koble .................. 134/167 R |
| 3,947,362 | 3/1976 | Etani .................. 210/416 |
| 3,957,634 | 5/1976 | Orensten .................. 210/11 |
| 4,092,245 | 5/1978 | Franks .................. 210/64 |
| 4,127,485 | 11/1978 | Baker .................. 210/169 |
| 4,188,295 | 2/1980 | Burnett .................. 210/206 |
| 4,217,331 | 8/1980 | Schaub . |
| 4,265,751 | 5/1981 | Williiger .................. 210/169 |
| 4,290,883 | 9/1981 | Sama .................. 210/169 |
| 4,443,899 | 4/1984 | Johnson .................. 4/90 |
| 4,574,048 | 3/1986 | van den Broek .................. 210/36 |
| 4,610,783 | 9/1986 | Hudson .................. 210/169 |
| 4,642,833 | 2/1987 | Stolz .................. 15/1.7 |
| 4,691,732 | 9/1987 | Johnson et al. . |
| 4,766,931 | 8/1988 | Chauvier .................. 137/624.14 |
| 4,768,532 | 9/1988 | Johnson .................. 134/111 |
| 4,776,954 | 10/1988 | Brooks . |
| 4,950,393 | 8/1990 | Goettl .................. 210/169 |
| 4,957,623 | 9/1990 | Henzlik . |
| 4,986,906 | 1/1991 | Dadisman .................. 210/169 |
| 5,093,950 | 3/1992 | Heir .................. 15/1.7 |
| 5,100,541 | 3/1992 | Kallenbach .................. 210/94 |
| 5,105,496 | 4/1992 | Gray .................. 15/1.7 |
| 5,135,579 | 8/1992 | Goettl .................. 134/10 |
| 5,225,074 | 7/1993 | Moini . |
| 5,238,585 | 8/1993 | Reed .................. 210/85 |
| 5,317,776 | 6/1994 | DeMoura . |
| 5,338,446 | 8/1994 | Schuman .................. 210/169 |
| 5,474,673 | 12/1995 | Ludlow .................. 210/151 |
| 5,527,455 | 6/1996 | Hoffa .................. 210/169 |
| 5,545,335 | 8/1996 | Sween .................. 210/748 |
| 5,603,135 | 2/1997 | Jones .................. 15/1.7 |
| 5,802,512 | 3/1999 | Denkewicz et al. . |

Primary Examiner—Jay H. Woo
Assistant Examiner—Fred Prince
Attorney, Agent, or Firm—Jacobson & Johnson

[57] ABSTRACT

A pool apparatus that simultaneously removes debris from the water and kills bacteria in a portion of the water passing through the pool apparatus with the pool apparatus having an intake head for drawing water and debris from a first region of the pool and directing the water and debris to a housing having a restrictor therein for directing a portion of the water through a bacteria killing material and the remaining portion with the debris therein to a collector where the debris is collected and the water is returned to the pool.

18 Claims, 3 Drawing Sheets

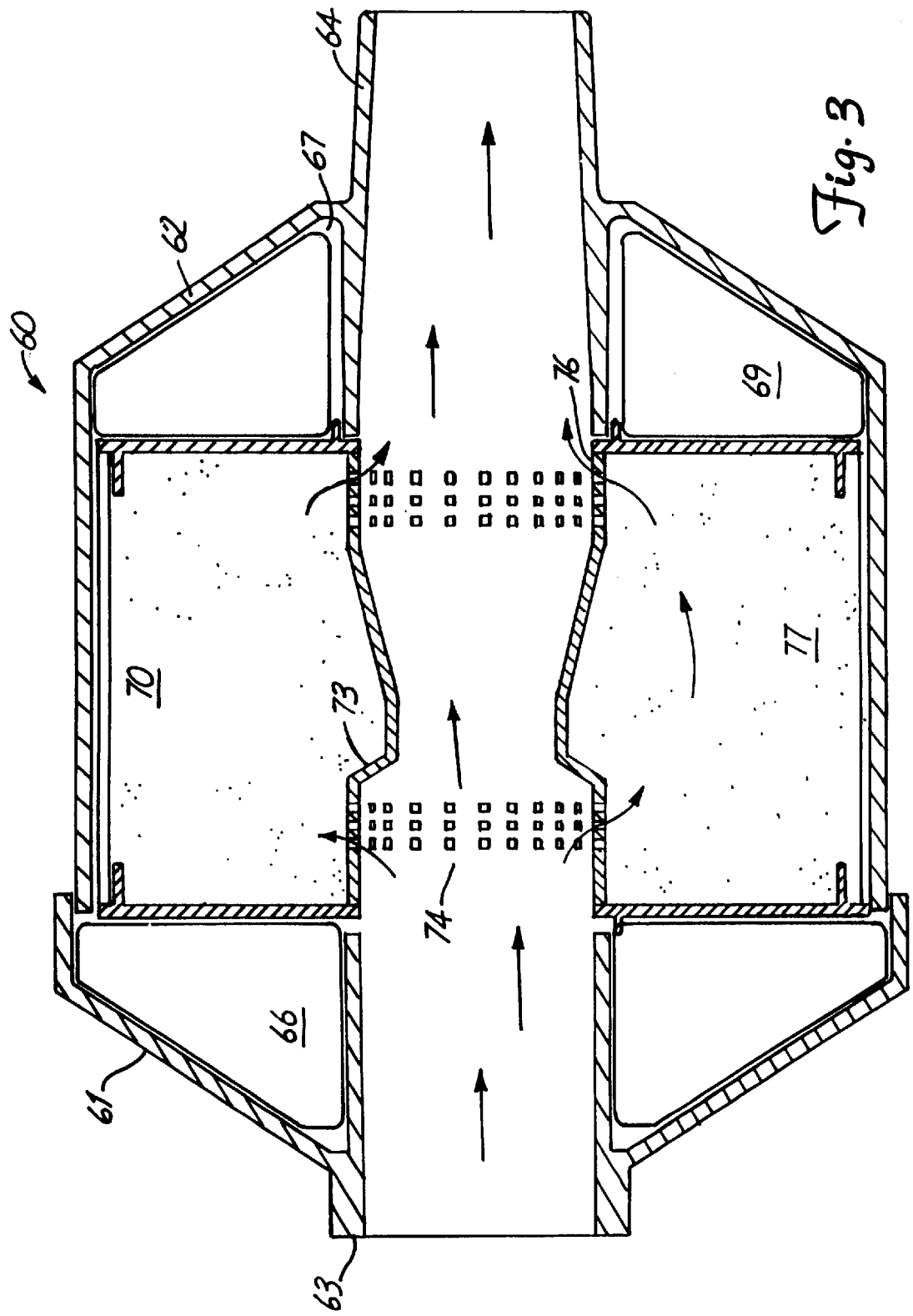

POOL CLEANING AND SANITIZING APPARATUS

FIELD OF THE INVENTION

This invention relates generally to a pool apparatus and more specifically to a pool apparatus that simultaneously removes debris from the water and kills bacteria in a portion of the water passing through the pool apparatus.

BACKGROUND OF THE INVENTION

Pool cleaning systems for removing debris from the bottom of spas and pools are known in the art, as are inline systems for killing bacteria in spas and pools. The two systems operate independently with respect to one another. The pool cleaning system has a mobile suction apparatus for collecting debris that has fallen or blown into the pool. To remove debris from the pool, one moves a water intake head around the bottom of the pool to suck water and debris into the pool cleaner where the debris is removed from the water. The water is then returned to the pool. On the other hand, the bacteria killing system is generally a stationary device that circulates pool water through a dispersal valve containing a bacteria killing material such as chlorine or the like. The water passing through the bacteria killing system kills the bacteria that pass therethrough. The water is then returned to the pool. Thus, one system removes debris that falls into the water and requires a mobile intake head to reach all areas of the pool, while the other system kills harmful bacteria that are present in the water utilizing a stationary device that sucks water from one area of the pool. Both systems are necessary to maintain the water in a spa or pool in a sanitary condition; however, the systems are kept separate because the debris in the water could quickly clog the pathways through the bacteria killing material thus rendering the bacteria killing material ineffective. As the debris usually settles to the bottom of the pool the water containing debris does not usually enter the bacteria killing system thus avoiding the problem of clogging the bacteria killing system with debris.

In contrast to the prior art pool cleaning devices that only remove debris, or the bacteria killing systems that only kill bacteria, the present invention provides a pool cleaning device that not only cleans the pool of debris but simultaneously kills bacteria in a portion of the uncleaned water passing through the pool cleaning device by separating the stream of water passing therethrough into two streams. A first stream that carries the heavier debris through the housing and a second stream that is substantially free of debris that is directed through a bacteria killing material to thereby simultaneously kill bacteria and remove debris from water drawn for various locations in the pool.

The present invention has been found particularly useful in addressing the problem of inadequate water circulation through an offsite bacteria killing system. That is, because of the geometric configuration of certain pools, the pool may contain "dead spots" where water in the pool does not circulate through the bacteria killing system. Consequently, there may be pockets of pool water with higher bacteria concentrations then other parts of the pool simply because the water from one or more portions of the pool does not circulate through the bacteria killing system. Unfortunately, the presence or location of these dead regions are not easy to detect. The present invention addresses the problem of inadequate water circulation in dead pockets of water by providing a pool cleaner with an off-line bacteria killing system that kills bacteria in a portion of the water passing through the pool cleaning apparatus. With the present invention, which is generally moved throughout the bottom of the pool, the intake head comes into contact with the regions of the pool that contain dead pockets of water that would not normally circulate through the inline dispersal valve. The pool cleaning apparatus not only removes debris but it draws water from the dead pockets with a portion of the water from the dead pockets being sent through the pool cleaner off-line bacteria killing canister to kill bacteria therein. The remaining portion of the water carrying the debris is sent to a collector where the debris is removed from the water. Consequently, the use of the pool cleaner of the present invention simultaneously allows one to remove debris and to bring the bacteria killing chemicals or minerals to the water in different parts of the pool, rather than bringing the water in the pool to a stationary offsite bacteria killing site which would create dead spots.

DESCRIPTION OF THE PRIOR ART

U.S. Pat. No. 3,132,364 discloses debris cleaner having a collector located at the intake of the cleaner.

U.S. Pat. No. 3,481,470 discloses a combined skimmer and filter for a swimming pool.

U.S. Pat. No. 3,755,843 discloses a pool vacuum system for cleaning a pool.

U.S. Pat. No. 3,794,052 discloses a pool cleaning apparatus to direct water into remote portions of the pool.

U.S. Pat. No. 3,947,362 discloses a liquid filter using an open cell elastomer foam body.

U.S. Pat. No. 3,957,634 discloses a filter for an aquarium.

U.S. Pat. No. 4,092,245 discloses a system for purifying a body of water such as a swimming pool.

U.S. Pat. No. 4,127,485 discloses a vacuum filter for swimming pools.

U.S. Pat. No. 4,188,295 discloses a chlorinator and filter for treating water during the initial filling of a pool.

U.S. Pat. No. 4,265,751 discloses an external aquarium filter.

U.S. Pat. No. 4,290,883 discloses a device for separating two components in a body of fluid.

U.S. Pat. No. 4,574,048 discloses a vacuum filter system using replaceable cartridges.

U.S. Pat. No. 4,610,783 discloses an attachment for a swimming pool to direct water therethrough to kill algae.

U.S. Pat. No. 4,642,833 discloses a valve assembly that results in a pulsating flow in a swimming pool cleaner.

U.S. Pat. No. 4,766,931 discloses a valve for periodically opening and closing a flow path.

U.S. Pat. No. 4,950,393 discloses pool cleaning apparatus using sweep hoses to place small particles in suspension.

U.S. Pat. No. 4,986,906 discloses a water purification system using a cathode and anode.

U.S. Pat. No. 5,100,541 discloses an inline debris trap.

U.S. Pat. No. 5,105,496 discloses a suction cleaning device for cleaning a pool.

U.S. Pat. No. 5,135,579 discloses a method an apparatus for removing sediment from a pool that directs jets of water through the pool.

U.S. Pat. No. 5,238,585 discloses a debris cleaning apparatus for a spa.

U.S. Pat. No. 5,338,446 discloses a pool cleaning unit having a cartridge for flow of water therethrough.

U.S. Pat. No. 5,474,673 discloses a top mounted aquarium filter.

U.S. Pat. No. 5,527,455 discloses a fluidized bed filter system for fish tanks.

U.S. Pat. No. 5,545,335 discloses a system for purifying and clarifying water using ultraviolet radiation.

U.S. Pat. No. 5,603,135 discloses a pool cleaner with a mast attachment.

SUMMARY Of THE INVENTION

Briefly, the present invention comprises a pool apparatus that simultaneously removes debris from the water and kills bacteria in a portion of the water passing through the pool apparatus with the pool apparatus having an intake head for drawing water and debris from all regions of the pool and directing the water and debris to a housing capable of directing a first stream of water with debris into the pool cleaner where the debris is collected while directing a second stream of water without debris through a bacteria killing material to ensure that all areas covered by the pool cleaner receive bacterial killing action.

BRIEF DESCRIPTION OF THE DRAWINGS

FIG. 3 is an alternate embodiment of the invention.

DESCRIPTION OF THE PREFERRED EMBODIMENT

Figure 1:
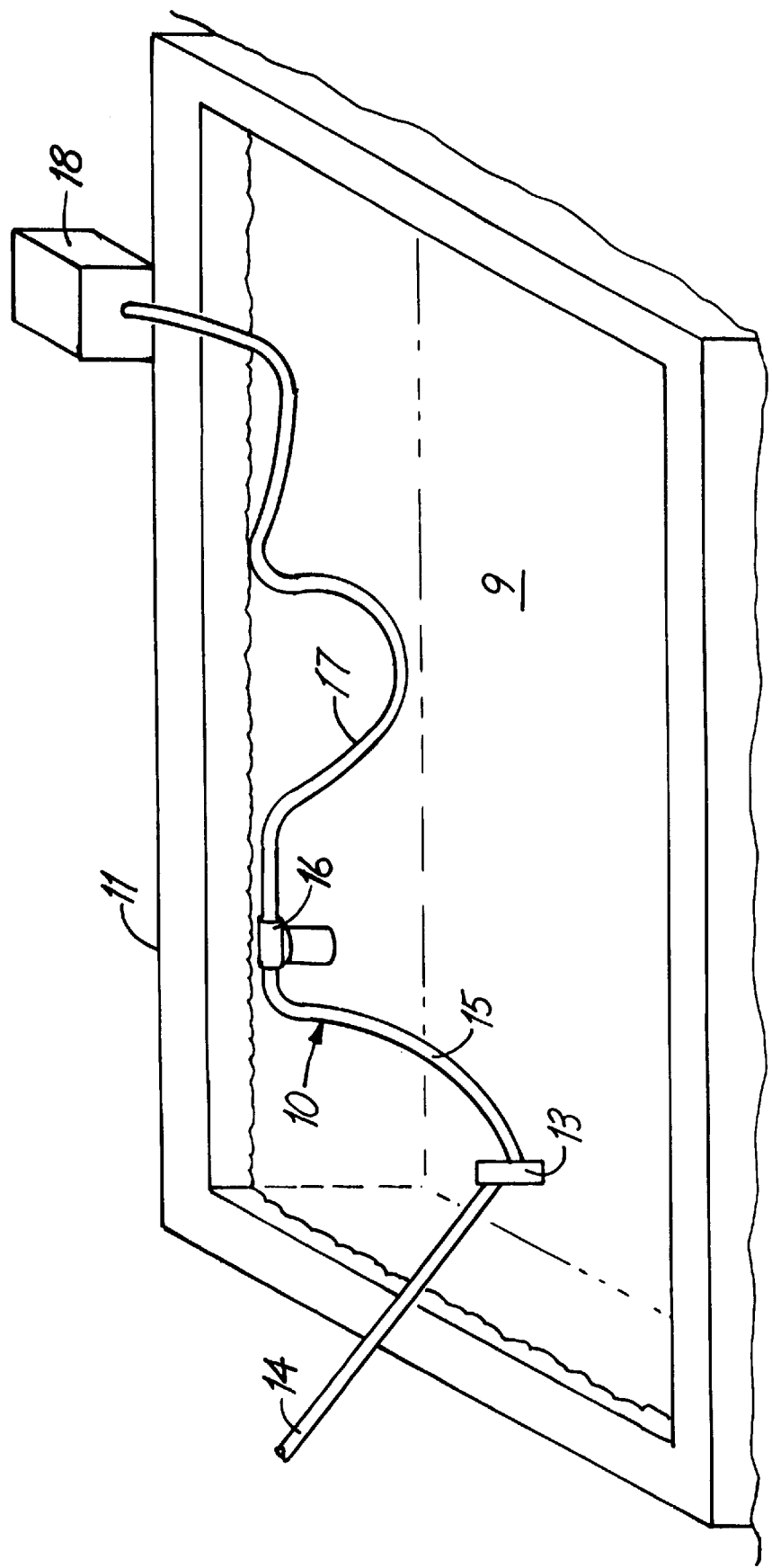
FIG. 1 is a perspective view of my pool apparatus located in a swimming pool.

FIG. 1 is a perspective view of my pool apparatus 10 located in a swimming pool 11 partially filled with water 9. Pool apparatus 10 includes an intake head 13 which has an opening therein sufficiently large to draw both water and debris therein. Intake head 13 is connected to a pole 14 to allow a person standing along the edge of pool 11 to move intake head 13 along the bottom of the pool to draw water and debris therein. Connected to intake head 13 is a flexible hose 15 that also connects to one end of a housing 16 which connects to an off-line bacteria killing apparatus 30. Connected to the other end of housing 16 is a second flexible hose 17 that connects to a pump and collector 18 for removing debris such as leaves and the like from the water being drawing through intake head 13. Off-line bacteria killing apparatus 30 is shown floating on pool water 9 so as to keep the hoses 15 and 17 from becoming tangled. The attachment to a flexible hose provides a container holding a bacteria killing composition in the pool but in an off-line condition.

Figure 2:
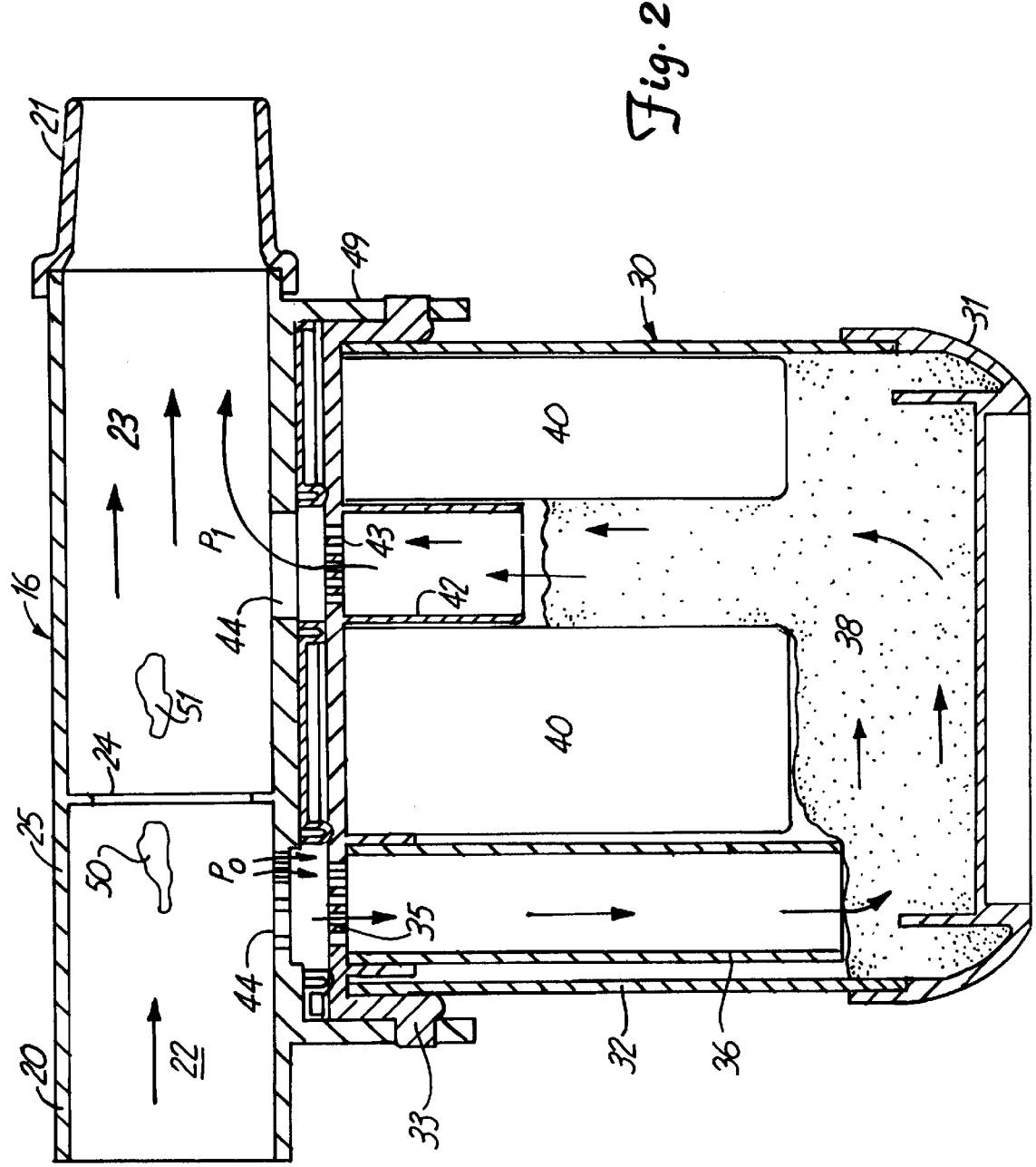
FIG. 2 is a cross sectional view of my off-line bacteria killing system.

FIG. 2 shows a cross-sectional view of my housing 16 and off-line bacteria killing apparatus 30 having an inlet coupling 20 connected by a conduit 25 to an outlet housing or coupling 21. Located within conduit 25 is a fluid restrictor 24 in the form of a large orifice that provides some restriction to water moving directly through conduit 25. The result is that the pressure $p_o$ increases on the upstream side 22 as opposed to the down stream side 23 so that a portion of the water is diverted through a bacteria killing apparatus 30 that includes a receptacle or cylindrical canister 29. Canister 29 includes a bottom section 31, an intermediate circular section 32 and an upper section or top 33 that locks into an extension 49 attached to the outside of conduit 25. Upper section or top 33 includes a first set of water inlet openings 35 and a standpipe 36 for directing water to the bottom of canister 29. Located on the bottom of canister 29 is a bacteria killing composition 38. Bacteria killing composition may take different forms and can, for example, be such material as chlorine or zinc particles having a coating of silver located on the exterior surface of the chlorine or zinc particles. In order to provide the proper buoyancy to my canister 29, foam 40 is included therein to occupy a portion of the space within canister 29.

Connected to top 33 is a second stand pipe 42 that directs sanitized water through a set of water outlet openings 43 and a main opening 44 in conduit 25.

In operation of the off-line bacteria killing canister 29, a portion of the water flows down stand pipe 36 and percolates through bacteria killing material 38 and up through passage 42 where the sanitized water is mixed with the water passing through orifice 24. At this point the portion of the water which rejoins with the stream of water passing through orifice 24 has been sanitized by killing the bacteria in the water as it passes through bacteria killing material 38. However, the remaining portion of the water passing through conduit 25 has not been sanitized. Thus, the off-line bacteria killing apparatus 30 provides for killing of bacteria in a portion of the water passing through conduit 25. However, the water passing through the bacteria killing apparatus 30 might be water that normally would not get cycled through the off-site bacteria killing system because of dead spots in the pool.

In operation of my system, the main portion of the fluid stream which is shown carrying debris 50 and 51 generally moves at sufficient velocity so that the debris, which is usually heavier than the water, is carried through the orifice 24 and through outlet housing 21 by the momentum of the water. After exiting housing 21 the water is directed to a collector that removes the debris from the water.

In the present invention the inlet screen 44 is located in the region where fluid is flowing past and preferably is slightly raised above the wall of the housing so that debris that should come into contact with screen 44 is washed downstream by the momentum of the water passing through orifice 24. In addition as the debris particles are usually heavier than water if they are moving at the same speed as the water they have greater momentum and will tend to continue to move straight through housing 21 while the water with less momentum will flow through the bacteria killing material. Thus, the large debris particles tend to be carried through orifice 24 and out of outlet housing 21, while a portion of the water passes through the bacteria killing composition 38 in canister 29. Consequently, as the pool is being cleaned of debris, a portion of the water or a stream of water that contains little or no debris is being cleansed of bacteria by passing the water through the bacteria killing composition 38.

As can be seen from the operation of the present system, the present invention address the problem of dead pockets of water by providing a mobile pool cleaner with an off-line bacteria killing system to kill bacteria in a portion of the water passing through the pool cleaner apparatus. That is, with the present invention, as the pool cleaner intake head 13 is moved around the pool into areas which may contain dead pockets, it draws water from the dead pockets with a portion of the water sent through the off line backer killing canister 29 to kill bacteria therein and the remaining portion carrying the debris is sent to a collector 18 that collects the debris where it can be removed from the water. Thus areas of the pool which might not receive bacteria killing action do so because the bacteria killing action is provided during the pool cleaning operation.

Referring to FIG. 3 an alternate embodiment of pool sanitize or receptacle 60 is shown comprising a an annular inlet housing 61 having a circular inlet extension 63 for connecting directly into a pool cleaning line with annular inlet housing 61 connected to an annular outlet housing 62 having a circular outlet extensive 64 for connecting directly into a pool cleaner line. That is, the present invention can be used as an after-market device in that the sanitizer can be connected directly into the line of an existing pool cleaner to provide the pool cleaner with the ability to also sanitize at least a portion of the water passing through the pool cleaner.

Pool sanitizer 60 includes a first closed annular compartment 65 that contains a flotation material such as polystyrene therein and a second closed annular compartment 67 that contains a second flotation material 69 therein. Centrally located within pool sanitizer 60 is a third annular compartment 70 that contains bacteria killing material 77 therein. Located within the center is a circular conduit 73 with a circular restrictor 71 which comprises a reduced cross sectional flow area. Located upstream of restrictor 71 is a set of opening 74 that are circumferentially spaced around conduit 73. Similarly, located downstream of restrictor 71 is a second set of openings 76 that are circumferentially spaced around conduit. The first set of openings 74 provide an outlet for water to pass therethrough and into the bacteria killing material 77 in compartment 70 while the second set of openings 76 provide an inlet for the water to return to the conduit 73.

In operation of the pool sanitizer of FIG. 3 the water enters inlet housing 63. The restriction 71 produces a venturi like effect that directs water radially outward through openings 74. However, since the water moving through the center of the restrictor moves faster than the water in the larger portion of the content it has been found that the debris in the water is generally carried through the pool sanitizer 60 while a portion of the water contains little or no debris flows along the peripheral region of the pool sanitizer and is diverted though the bacteria killing material 77. Consequently, the increased velocity of the water as it passes through restriction 71 in conduit 73 pulls the debris though the central portion of the conduit stream so that the water removed from the peripheral region of the conduit contains less debris and can be circulated through the bacteria killing material without prematurely plugging the pathways through the bacteria killing material.

It will be appreciated that with the present invention one can simultaneously clean the pool of debris and kill bacteria in the pool thus providing a more effective bacteria killing operation. The present invention is particularly useful in areas where dead spots and debris is a problem as it ensures that the pool water will be cleaned and the same time bacteria in the pool will be held down by the circulation of a portion of the water from dead pockets through the bacteria killing system. It should be also pointed out that debris has a tendency to settle into the dead spots in the pool as there is less circulation in the dead spots to disperse the debris around the pool. Thus the present invention of a pool cleaner to remove debris generally targets areas of the pool where it is most likely that the water has not received sufficient bacteria killing action.

It will be envisioned that the present invention can be used to enhance or boost the sanitizing of the water and can easily be adapted to an existing pool cleaning system by cutting the suction hose and attaching the housing and canister thereto. In addition, although the pool cleaning system is shown on the suction side it could also be used on the pressure side if desired.

Thus the present invention provides an aftermarket pool sanitizer for converting a pool cleaner into a pool apparatus that simultaneously removes debris from the water and kills bacteria in a portion of the water passing through the pool apparatus. The after-market pool sanitizer includes a housing having an inlet member for connection to an inlet hose of a pool cleaner with the housing having a conduit therein with a fluid restrictor therein for directing a portion of the water lateral of said conduit while allowing the water containing debris to flow straight through the conduit. The water that is directed laterally is directed into a compartment in the housing which holds the bacteria killing composition in a lateral off-line condition so that the restrictor can direct a portion of the water with less debris through the bacteria killing composition while the remaining portion with the debris therein is directed to a collector where the debris is collected and removed therefrom to thereby provide for simultaneously sanitizing and cleaning of the water drawn through the housing.

I claim:

1. A mobile pool cleaning apparatus for moving along the underwater surfaces of a pool and sanitizing water in pockets of pool water that may not normally circulate through a pool bacteria killing system comprising;

an intake head, said head having an opening therein sufficiently large to simultaneously draw a single stream of both water and debris therein;

a flexible hose, said flexible hose having a first end connected to said intake head and a second end, said flexible hose having sufficiently large diameter so as to allow water and pool debris to pass therethrough;

a housing having an off-line bacteria killing receptacle, said housing having an inlet member for engagement with said second end of said flexible hose and an outlet member said housing dividing the single stream of both water and debris into a first stream of water with debris and a second stream and directing the first stream of water with debris therethrough, said housing having a peripheral opening directing the second stream of water flowing through said housing through a bed of bacteria killing material in said off-line bacteria killing receptacle where bacteria are killed while the first stream of water and the debris therein flow past the off-line bacteria killing receptacle and into an off-site debris collector so that at the same time the pool cleaning apparatus can both remove debris and bring bacteria killing action to the pockets of the pool water that might not normally pass through an off-site bacteria killing system.

2. The pool cleaning apparatus of claim 1 wherein said bacteria killing receptacle has sufficient buoyancy to float on a surface of the water in a pool.

3. The pool cleaning apparatus of claim 2 wherein said off-line bacteria killing receptacle includes a restrictor and a screen for preventing debris from entering into said off-line bacteria killing receptacle.

4. The pool cleaning apparatus of claim 3 wherein said bacteria killing material includes a bed of bacteria killing minerals therein.

5. The pool cleaning apparatus of claim 2 wherein said bacteria killing receptacle includes a standpipe sufficiently long so as to direct water from the second stream to the bottom of the bacteria killing receptacle.

6. The pool cleaning apparatus of claim 5 wherein the housing includes an orifice therein to generate sufficient pressure to direct a portion of the water entering the pool cleaning apparatus to pass through the bacteria killing material.

7. The pool cleaning apparatus of claim 6 wherein the pool cleaning apparatus has a screen for preventing large debris particles from being drawn into the bacteria killing receptacle.

8. The pool cleaning apparatus of claim 7 wherein the bacteria killing receptacle is removable from the pool cleaning apparatus for replenishment of the bacteria killing material.

9. The method of simultaneously cleaning and sanitizing a pool by:

drawing a single stream of water containing debris and bacteria from different areas of the pool through an intake head;

dividing the single stream of water into a first stream and a second stream within the housing and directing the first stream of the water at sufficient speed so as to carry the debris straight through a housing and into a debris collector to thereby remove debris therefrom while at the same time directing the second stream water from a peripheral region of the housing in a lateral direction through a bacteria killing composition to kill bacteria therein so that at least the further portion of the water drawn through the intake head can be simultaneously rid of debris and bacteria to thereby subject the water from remote regions to bacteria killing action; and combining the second stream of water with the first stream of water and directing the combined stream of water to an off-site collector.

10. The method of claim 9 including the step of directing the water to the bottom of canister containing the bacteria killing composition.

11. The method of claim 10 including the step of restricting the water flow so as to direct a portion of the water through the bacteria killing composition.

12. The method of claim 11 wherein the bacteria killing composition is placed in a canister with the canister having sufficient buoyancy to float on the body of water.

13. A pool apparatus that simultaneously removes debris from the water and kills bacteria in a portion of the water passing through the pool apparatus with the pool apparatus comprising:

a mobile underwater intake head for drawing a single stream of water and debris from a remote region on a bottom portion of a pool, a hose connected to said intake head for directing the water and debris therethrough;

a housing connected to said hose said housing having a restrictor therein for dividing the single stream of water into a first stream of water carrying debris that can be directed through said housing and a second stream of water that can be temporarily diverted from the single stream of water;

a container, said container holding a bacteria killing composition in an off-line condition with said restrictor directing the second stream of water through the bacteria killing composition so that water from the remote region of the pool can be subjected to bacteria killing action and the remaining portion of water with the debris therein can be directed to a collector where the debris is collected and removed therefrom.

14. The pool apparatus of claim 13 wherein the bacteria killing composition is chlorine.

15. The pool cleaning apparatus of claim 13 including a pole attached to said intake head for moving the intake head to different locations.

16. An after-market pool sanitizer for converting a pool cleaner into a pool apparatus that simultaneously removes debris from the water and kills bacteria in a portion of the water passing through the pool apparatus with the after-market pool sanitizer comprising;

a housing having an inlet member for connection to an outlet hose of a pool cleaner, said housing having a conduit therein for receiving a single stream of water of sufficient momentum to direct the single stream of water debris therethrough, said conduit having a restrictor therein for increasing the pressure of the single stream of water in said housing to thereby direct a portion of the single stream of water lateral of said conduit;

a compartment in said housing for holding a bacteria killing composition in a lateral off-line condition so that said restrictor can direct a portion of the water through the bacteria killing composition while the remaining portion with the debris therein is directed to a collector where the debris is collected and removed therefrom to thereby provide for simultaneously sanitizing and cleaning of the water drawn through said housing.

17. The after-market pool sanitizer of claim 16 wherein said housing includes a screen for preventing debris in the portion of the single stream from entering into said compartment in said housing.

18. The after-market pool sanitizer of claim 17 wherein the screen is located parallel to direction of flow of the incoming single stream of water and slightly raised so that in the event debris accumulates on the screen the debris is washed off by the single stream of water.

* * * * *